(12) United States Patent
Belschner et al.

(10) Patent No.: US 8,588,781 B2
(45) Date of Patent: Nov. 19, 2013

(54) METHOD FOR OPTIMIZING THE HANDOVER BEHAVIOR IN A MOBILE RADIO NETWORK

(75) Inventors: Jakob Belschner, Frankfurt (DE); Paul Arnold, Frankfurt (DE); Jhanani Murugesan, Wiesbaden (DE)

(73) Assignee: Deutsche Telekom AG, Bonn (DE)

( * ) Notice: Subject to any disclaimer, the term of this patent is extended or adjusted under 35 U.S.C. 154(b) by 146 days.

(21) Appl. No.: 13/380,056

(22) PCT Filed: May 18, 2010

(86) PCT No.: PCT/EP2010/056823
§ 371 (c)(1),
(2), (4) Date: Dec. 22, 2011

(87) PCT Pub. No.: WO2010/149435
PCT Pub. Date: Dec. 29, 2010

(65) Prior Publication Data
US 2012/0100857 A1 Apr. 26, 2012

(30) Foreign Application Priority Data
Jun. 25, 2009 (EP) .................................. 09163796

(51) Int. Cl.
*H04W 36/00* (2009.01)
(52) U.S. Cl.
USPC ............ 455/436; 455/437; 455/438; 455/439
(58) Field of Classification Search
USPC ........ 455/422.1, 436–444; 370/328, 331–333
See application file for complete search history.

(56) References Cited

U.S. PATENT DOCUMENTS

| | | | |
|---|---|---|---|
| 8,335,189 B2 * | 12/2012 | Wang et al. | 370/331 |
| 2004/0266434 A1 | 12/2004 | Lehtinen et al. | |
| 2006/0092878 A1 * | 5/2006 | Shirota et al. | 370/331 |
| 2010/0017247 A1 | 1/2010 | Liu et al. | |
| 2010/0210271 A1 | 8/2010 | Neubacher | |
| 2011/0080870 A1 * | 4/2011 | Bhalla et al. | 370/328 |

FOREIGN PATENT DOCUMENTS

DE 102007038099 A1 4/2009
WO WO 2008042013 A2 4/2008

OTHER PUBLICATIONS

André Schröder et al: "Distributed Self-Optimization of Handover for the Long Term Evolution" Self-Organizing Systems, Springer Berlin Heidelberg, Berlin, Heidelberg Bd, 6343, 10. Dec. 2008.
European Patent Office, International Search Report in International Patent Application No. PCT/EP2010/056823 (Aug. 11, 2010).

(Continued)

*Primary Examiner* — Ajit Patel
(74) *Attorney, Agent, or Firm* — Leydig, Voit & Mayer, Ltd.

(57) ABSTRACT

A method for optimizing handover behavior in a mobile radio network includes: a) determining, during a first period of time, the handover behavior of at least one base station of the mobile radio network, with current configuration values of the handover parameters of the at least one base station; b) evaluating a current configuration of the at least one base station based on the determined handover behavior during the first period of time; c1) in the case that step b) does not indicate a need for optimization: repeating steps a) and b); or c2) in the case that step b) indicates a need for optimization: setting an optimization parameter A to a maximum value Amax; and d) modifying configuration values of at least one handover parameter.

16 Claims, 2 Drawing Sheets

(56) References Cited

OTHER PUBLICATIONS

Belschner J et al: "Optimisation of Radio Access Network Operation Introducing Self -x Functions: Use Cases, Algorithms, Expected Efficiency Gains", 2009 IEEE 69th Vehicular Technology Conference; Apr. 26-29, 2009, Barcelona, Spain, IEEE, Piscataway, NJ, USA, Apr. 26, 2009, pp. 1-5.

Self-Optimisation & Self-Configuration in wireless networks (SOCRATES): Self-optimisation in future mobile access networks, Presentation at Mobile Network Optimisation 2008, Cannes, France, Nov. 3-6, 2008.

3GPP: "3rd Generation Partnership Project; Technical Specification Group Services and System Aspects; Telecommunications Management; Self-Optimization OAM; Concepts and Requirements (Release 9)", p. 1-25, May 2009.

André Schröder et al: "Distributed Self-Optimization of Handover for the Long Term Evolution" Self-Organizing Systems. Springer Berlin Heidelberg, Berlin, Heidelberg Bd. 5343, Dec. 10, 2008.

3GPP: "3rd Generation Partnership Project; Technical Specifications Group Radio Access Network, Evolved Universal Terrestrial Radio Access Network (E-UTRAN); Self-configuring and self-optimizing network Use cases and solutions (Release 9)", p. 1-23, May 2009.

\* cited by examiner

METHOD FOR OPTIMIZING THE HANDOVER BEHAVIOR IN A MOBILE RADIO NETWORK

CROSS-REFERENCE TO RELATED APPLICATIONS

This patent application is a national stage entry under 35 U.S.C. §371 of International Application No. PCT/EP2010/056823, filed May 18, 2010, and claims priority to European Patent Application No. EP09163796.7, filed Jun. 25, 2009. The International Application was published in German on Dec. 29, 2010, as WO 2010/149435 A1.

FIELD

The invention relates to methods for optimizing the handover behavior in a mobile radio network. In particular, the invention relates to avoiding erroneous handover, or unnecessary handover, so-called ping-pong handover.

BACKGROUND

One important function of a mobile radio network is mobility support, i.e., the ability to maintain a mobile radio connection of a mobile station (MS) even when the latter is moving out of the receiving range of one base station (BS) into the receiving range of another base station. For this purpose a so-called handover (HO) is initiated, i.e., the connection of a mobile station to a base station A is handed over to a base station B at a defined point of time.

In the context of a handover there are mainly two types of errors: On the one hand, there are unnecessary handovers (so-called ping-pong effects), i.e., a multiple and unnecessary switchover of a mobile station between two or more base stations. Ping-pong effects lead to an unnecessary exchange of management messages and should therefore be avoided. One method for detecting these effects is described for example in DE-A-10 2007 038 099. Another type of error is constituted by erroneous handovers (or so-called handover errors) which can result in a loss of the connection to a mobile station. These errors might for example occur when a handover is initiated too early or too late so that, at the time of the handover, the radio coverage by base station A or base station B cannot be ensured. Handover errors in any case lead to an interruption of the connection with a mobile station, but can also lead to a complete loss of the connection in extreme cases, and should therefore be avoided. The detection of handover errors has been known in the state of the art for some time.

The decision whether to initiate a handover, and also the moment of the handover, is dependent on several parameters, the so-called handover parameters. Configuration values for these parameters are stored in the mobile radio network (in networks according to the LTE standard, for example, in each base station, in networks according to the UMTS standard in a superordinate network component, the radio network controller—RNC). Widely used configuration parameters are the so-called hysteresis margin or the so-called time to trigger. The hysteresis margin (or hysteresis threshold) expresses how much stronger the transmission power received by the mobile station or the field strength of the target base station (corresponding to base station B mentioned above) has to be compared to the transmission power received by the source base station (corresponding to base station A) before a handover is initiated (see for example DE-A-10 2007 038 099). The time to trigger expresses for how long (e.g. how many milliseconds) the received transmission power of the target base station at the mobile station must be larger by the hysteresis margin as the received transmission power of the source base station before a handover is initiated.

There can be a number of further parameters in addition to these exemplary parameters, which have been listed because they occur in most mobile radio systems.

The settings of these configuration parameters are decisive for the initiation of handovers in a mobile radio network and therefore also have an impact on the number of ping-pong effects and handover errors that will occur. For this reason, in conventional networks, the statistics on ping-pong effects and handover errors are evaluated in regular intervals and the parameter settings are optimized in case of abnormally high values. This has some major disadvantages. First, a high proportion of manual processes entails high costs. In addition it might be sensible to modify the configuration values of the handover parameters on short notice if network conditions change (e.g. traffic jams on the motorway resulting in a temporarily reduced speed of the mobile station). This is nearly impossible in the state of the art.

To overcome these disadvantages, so-called self-optimization processes are the subject matter of current research (see for example the EU-funded research program Self-Optimisation & Self-Configuration in wireless networks (SOCRATES): Self-optimisation in future mobile access networks, Presentation at Mobile Network Optimisation 2008, Cannes, France, Nov. 3-6, 2008). With respect to handover parameters this means that it would be desirable for the network to be able to optimize the configuration values of the parameters autonomously. Initial approaches in this direction can be found, e.g., in DE-A-10 2007 038 099 (Paragraph [0012]: "to develop the methods for avoiding ping-pong handover in mobile radio networks in a way that the parameters, particularly the hysteresis of the reception field strength . . . can be automatically and autonomously set in order to avoid ping-pong handover . . . ") and US-A-2004/066434 (here, the configuration value of the "hysteresis" parameter changes between two fixed values).

SUMMARY

In an embodiment, the present invention provides a method for optimizing handover behavior in a mobile radio network. The method includes the steps of: a) determining, during a first period of time, the handover behavior of at least one base station of the mobile radio network, with current configuration values of the handover parameters of the at least one base station; b) evaluating a current configuration of the at least one base station based on the determined handover behavior during the first period of time; c1) in the case that step b) does not indicate a need for optimization: repeating steps a) and b); or c2) in the case that step b) indicates a need for optimization: setting an optimization parameter A to a maximum value Amax; d) modifying configuration values of at least one handover parameter; e) determining, during a second period of time, the handover behavior of the least one base station of the mobile radio network, with the modified configuration values of the handover parameters of the at least one base station; f) evaluating a modified configuration of the at least one base station based on the determined handover behavior during the second period of time; g) comparing a result of the evaluation of the current configuration of the at least one base station with a result of the evaluation of the modified configuration of the at least one base station; h1) accepting the modified configuration with a probability depending on a current level of the optimization parameter A if step g) indicates that the modified configuration is worse than a preceding configuration, and continuing with step (i); or h2) accepting the modified configuration and checking whether a check result for the modified configuration fulfills a termination criterion if step g) indicates that the modified configuration is better than the preceding configuration; i) reducing the optimization parameter A; and j) repeating steps d) to i).

DETAILED DESCRIPTION

Figure 1:
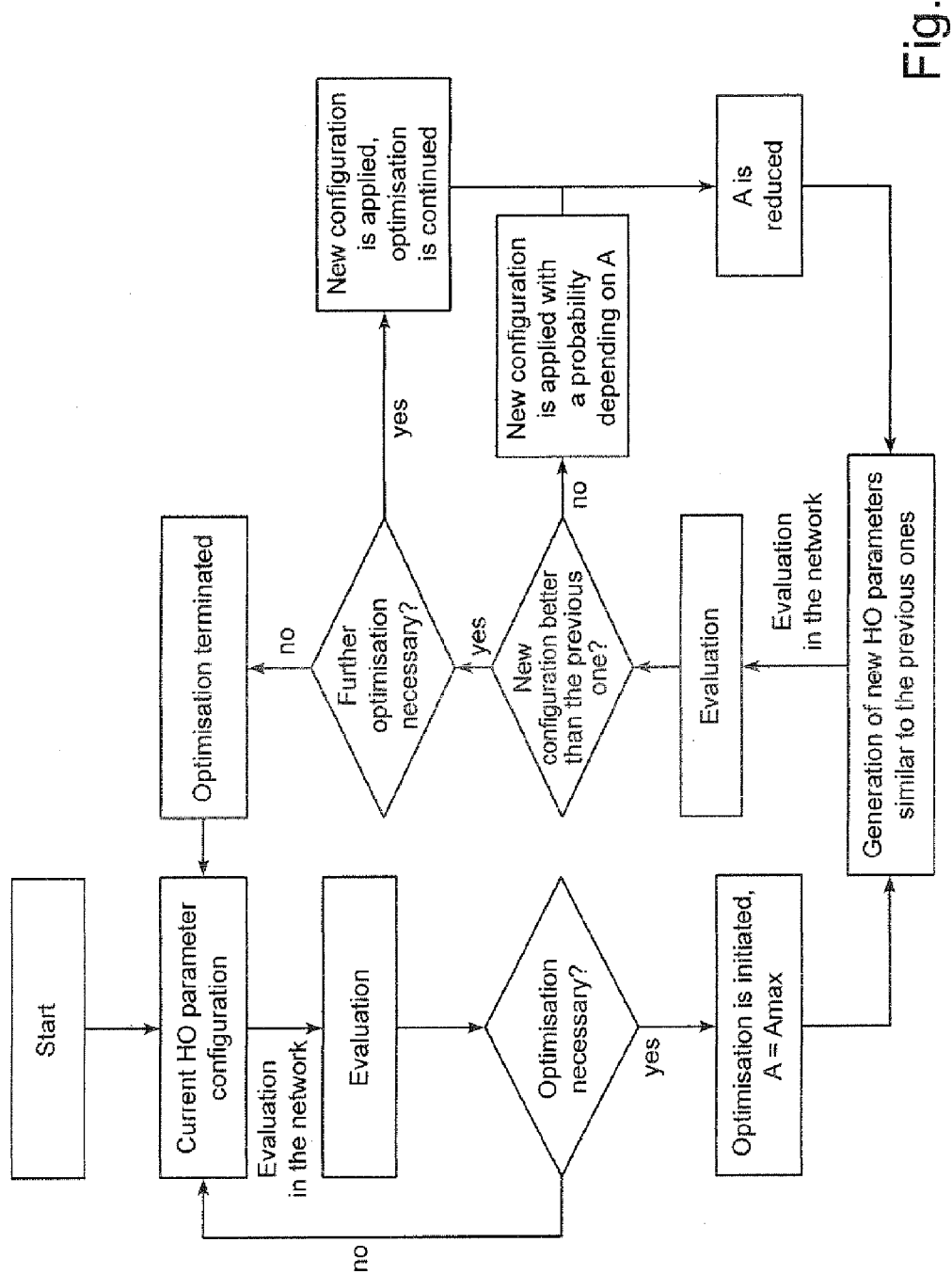
FIG. 1 shows a representation of an exemplary embodiment of a method according to the invention.

In an embodiment, the invention provides a method which optimizes the handover behavior in a mobile radio network.

In an embodiment, the method relates to mobile radio networks in which the handover parameters are set in a base station or a superordinate network component (e.g. networks based on the GSM, UMTS, LTE standards). The method may be applied in a single base station and will provide for self-optimization of the handover parameters of said base station. Alternatively, the method may be applied in a superordinate network component which is connected to a plurality of base stations and sets the handover parameters thereof. Insofar as a superordinate network component is capable of respectively setting separate handover parameters for each of the base stations controlled by it, the method can optimize the handover parameters of each of these base stations individually. If it is only possible to establish handover parameters for a group of base stations, the handover parameters of this group will be optimized.

The method is not limited to the optimization of the two parameters mentioned above. On the contrary, one of the advantages is that the method can optimize any parameters.

In an embodiment, a method is provided for optimizing the handover behavior in a mobile radio network, including the steps of:
a) determining, during a given period of time, the handover behavior of at least one base station of the mobile radio network, with current configuration values of the handover parameters of the at least one base station;
b) evaluating the configuration of the at least one base station based on the determined handover behavior;
c1) in the case that step b) does not indicate any need for optimization: Repeating the steps a) and b); or
c2) in the case that step b) indicates the need for optimization: Setting an optimization parameter A to a maximum value Amax;
d) modifying the configuration values of at least one handover parameter;
e) determining, during a given period of time, the handover behavior of the least one base station of the mobile radio network, with modified configuration values of the handover parameters of the at least one base station;
f) evaluating the modified configuration of the at least one base station based on the determined handover behavior;
g) comparing the evaluation results with and without modification of the configuration values;
h1) accepting the modified configuration with a probability depending on the current level of the optimization parameter A, if step g) indicates that the modified configuration is worse than the preceding configuration, and continuing with step (i); or
h2) accepting the modified configuration and checking whether the check result for the modified configuration fulfils a termination criterion, if step g) indicates that the modified configuration is better than the preceding configuration;
i) reducing the optimization parameter A; and
j) repeating steps d) to i).

In an embodiment, errors occurring in steps a) and e), such as erroneous handovers or unnecessary handovers are determined, wherein a handover error rate or a ping-pong rate may further be determined. The evaluation of the respective configuration in steps b) and f) is effected on the basis of an evaluation function that takes into account the occurring errors, in particularly the error rates. In a further embodiment, a further step of comparing the evaluation result with at least one threshold value with respect to the necessity of an optimization of the handover behavior is executed in step b). If no optimization of the handover behavior is necessary, the current handover parameters will be maintained and the method continued with step a).

In an embodiment, the modification of the configuration values in step d) is effected by (i) selecting a first handover parameter, (ii) choosing whether the selected parameter should be increased or reduced, (iii) accordingly increasing or reducing the parameter value by the smallest possible step, (iv) possibly repeating the steps (i) to (iii) for at least one further handover parameter.

In step h2), a step of comparing the evaluation result of the modified configuration with at least one threshold value with respect to the termination of the optimization of the handover behavior is executed. If a termination of the optimization of the handover behavior is possible, the modified handover parameters are applied and the method is continued with step a); if a termination of the optimization of the handover behavior is not yet possible, the modified handover parameters are applied and the method is continued with step i).

In an embodiment, different threshold values are used for the initiation of the optimization and the termination of the optimization.

According to one embodiment, the configuration values of the handover parameters are stored in a superordinate network component. Alternatively, they are respectively stored locally in the respective base station. For this purpose, each of the base stations has a software component, the respective software component performing the determination and local storage of the configuration values for the handover parameters.

In an embodiment, the hysteresis margin (hysteresis threshold) and the time to trigger (switchover threshold) are regarded as handover parameters.

In an embodiment a network component is provided in a mobile radio network for optimizing the handover behavior in the mobile radio network. The network component includes:
a device for determining, during a given period of time, the handover behavior of at least one base station of the mobile radio network, with current configuration values of the handover parameters of the at least one base station;
an evaluation device for evaluating the configuration of the at least one base station based on the determined handover behavior;
a setting device for setting an optimization parameter A to a maximum value Amax;
a device for modifying the configuration values of at least one handover parameter; wherein the determination device determines, during a given period of time, the handover behavior of the at least one base station of the mobile radio network with modified configuration values of the handover parameters of the at least one base station, and the evaluation device evaluates the modified configuration of the at least one base station based on the determined handover behavior;
a comparing device for comparing the evaluation results without and with the modification of the configuration values, wherein the network component is adapted (1) to accept the modified configuration with a probability depending on the current level of the optimization parameter A, if the modified configuration is worse than the preceding configuration, or (2) to check whether the evaluation result for the modified configuration fulfils a termination criterion, if the modified configuration is better than the preceding configuration; and wherein the network component is adapted to subsequently continue the optimization with a reduced optimization parameter.

In an embodiment, an automatic self optimization of a plurality of handover parameters with respect to a plurality of objectives is provided. It allows e.g. for a simultaneous optimization of the handover parameters hysteresis margin and time to trigger, with the objective of minimizing ping-pong effects and handover errors at the same time. By contrast, with methods according to the state of the art, it is only possible to optimize one single parameter with one single objective.

The self optimization of a plurality of parameters with a plurality of objectives has at least the following advantages:

General advantages of self optimization (no manual efforts, reaction to short-term changes, see description of the underlying problem)

By using a plurality of parameters for the optimization simultaneously, better results can be achieved than with the optimization of one parameter only.

In practical implementation, it is advantageous to follow several objectives simultaneously, since the handover parameters might have contradictory effects on individual objectives. If, for example, handover parameters in a network are optimized with the single objective to reduce ping-pong effects, this often leads to an excessively increased number of handover errors.

It is not necessary to know in advance what effect a modification of the handover parameters will have on the handover behavior. For example, DE-A-10 2007 038 099 indicates that the "hysteresis" parameter is increased if too many ping-pong effects occur. This assumes it to be known that an increase in the configuration values of this parameter avoids ping-pong effects. For a plurality of parameters and objectives, it is likely that it is not known what effect a modification of the parameters will have. In this case, methods such as those described in DE-A-10 2007 038 099 are not functional.

It can be said that conventional methods are based on the principle of implementing known solutions for a recognized problem (see, e.g., DE-A-10 2007 038 099: In the case of too many ping-pong effects, the "hysteresis" parameter is increased, since this has proven to be effective according to previous experience). In contrast, the method according to an embodiment of the present invention is heuristic. It is therefore able to find a solution for an occurring problem autonomously.

Exemplary embodiments of the invention will now be explained in more detail with reference to the accompanying drawings.

The method according to an exemplary embodiment of the invention will now be explained step by step in more detail with reference to FIG. 1. Here, it is assumed that the handover parameters are specific for each base station. In the case that handover parameters can only be set for a group of base stations, the term "base station" may be replaced by the phrase "group of base stations".

1. Initially, there already exists a configuration of the handover parameters. This can be already configured in the network, predetermined externally or generated randomly.

2. If not already done, the handover parameters are configured in the base station.

3. During a pre-established period of time (e.g. 1 minute) it is measured which handover behavior will result from the current handover parameters (e.g. how many ping-pong effects and handover errors have occurred). From these measured values, one or more values are calculated according to a defined evaluation function, the calculated values indicating the degree to which the handover behavior with the current handover parameters corresponds to the desired objectives. The evaluation function thus reflects the given objectives of the optimization.

4. Now it is checked whether the current configuration is acceptable or needs to be optimized. This can be achieved e.g. by comparing the result of the evaluation with threshold values.

5. If no optimization is necessary, the current handover parameters are maintained. The current behavior is continued to be monitored (jump to par. 3) in order to be able to react in the case of changes in the network.

6. If an optimization is necessary, the optimization parameter A is first set to an established maximum value.

7. Subsequently, new configuration values for the handover parameters are generated. However, these should only deviate slightly from the previous values to avoid the configuration of completely inappropriate settings in the network. One possible and preferred procedure for generating the new configuration is as follows:

a. Start with the first handover parameter to be optimized. Choose randomly whether the parameter should be increased or reduced.

b. Increase or reduce the handover parameter by the smallest possible step.

c. Start at a with the next parameter.

8. The new configuration is now configured and evaluated, as described in steps 2 and 3.

9. Analysis of the new evaluation result a. If the evaluation result of the new configuration is inferior to the one of the previous configuration, the new configuration is accepted with a probability that depends on the current level of the optimization parameter A. The higher A, the higher the probability that the new configuration (even if it is inferior to the previous one) is accepted. This should avoid that new configurations are excluded prematurely, even if they might lead to favourable results during the process of further optimization.

b. If the evaluation result of the new configuration is superior to the one of the previous configuration, it will be checked whether the new result already fulfills the criteria for a termination of the optimization. If this is the case, the procedure jumps to par. 2. If not, the new configuration is applied, but the optimization will be continued.

10. The optimization parameter A is now reduced. As a result, the probability that inferior configurations are accepted decreases.

11. Jump to par. 7.

As can be seen from FIG. 1, this may be a continuous process, i.e., whether the handover parameters of a base station lead to an acceptable handover behavior is checked continuously. If this is not the case, new and optimized parameters will be generated and configured. In an alternative embodiment, discontinuous implementation of the method shown in FIG. 1 may also be used.

Figure 2:
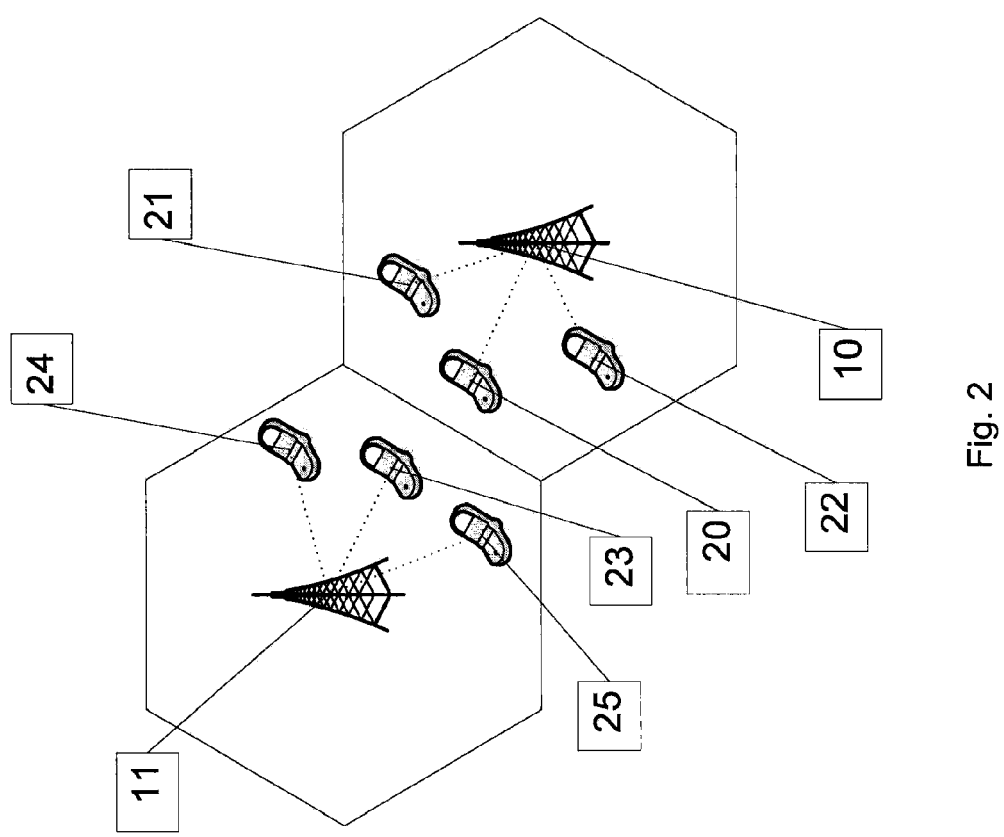
FIG. 2 shows an exemplary mobile radio network to illustrate the method according to an embodiment.

In FIG. 2, the method according to an exemplary embodiment of the invention is described in greater detail with reference to an example. FIG. 2 shows two base stations 11 and 12, and six mobile stations 20 to 25. The mobile stations 20 to 22 are connected to base station 10 and the mobile stations 23 to 25 to base station 11. All mobile stations, however, are located in the boundary zone between base stations 10 and 11, i.e., the radio field strengths of the base stations 10 and 11 at the positions of the mobile station are similar. The handover parameters are stored in the base stations, i.e., base stations 10 and 11 each have their own handover parameters. The handover parameters are valid for all mobile stations that are connected to a base station. Thus, the handover parameters of base station 10 are valid for mobile stations 20 to 22, and the handover parameters of base station 11 for mobile stations 23 to 25. The method according to this exemplary embodiment for automatic self-optimization of the handover parameters functions autonomously in base station 10 and 11, respectively.

In this exemplary embodiment, the hysteresis margin (hm) and time to trigger (ttt) are regarded as the handover parameters. It is known from experience in the operation of mobile radio networks that low configuration values for these parameters lead to few handover errors, but to a large number of ping-pong effects. Vice versa, high configuration values, as a rule, lead to few ping-pong effects, but to a large number of handover errors. However, the method according to this exemplary embodiment does not in any way presume that these effects of the handover parameters on the handover behavior must be known in advance. The aforementioned principles are given for explanatory purposes only.

It is further assumed for this example that a ping-pong effect or handover error occurring during a handover between base station 10 and 11 will be detected by both base stations. Depending on the mobile radio standard, individual base stations might only detect parts of these effects (e.g., base station 10 might only detect handover errors for handovers from base station 10 to base station 11, but not for handovers from base station 11 to base station 10). In this case, the method can be performed based on the existing partial information.

As the start configuration, it is presumed for the present exemplary embodiment that both hm and ttt are set to the lowest possible values, i.e. hm=0 dB, ttt=0 ms, for example. The method now passes through the following steps:
1. It is checked in both base stations, for a pre-established period of time (e.g. 1 minute), which handovers result from the parameters set. Result assumed for this example:
a. Mobile station 21 switches over to base station 11 and subsequently back to base station 10. This means that both handovers were unnecessary.
b. Mobile station 24 switches from base station 11 over to base station 10.
c. In addition, it is assumed that all handovers are successful, i.e., no handover errors occur.
d. This leads to the following result: Handover error rate: 0%, Ping-pong rate: 66% (both handovers of mobile station 21 were unnecessary, only the handover of mobile station 24 was necessary).
2. Now it is checked whether the current configuration is acceptable or needs to be optimized. For this example, it is assumed that a handover error rate of 5% and a ping-pong rate of 10% can be accepted. The optimization is initiated since the admissible ping-pong rate has been exceeded.
3. The optimization parameter A is set to its maximum value, e.g. 30.
4. Now, new configuration values for the handover parameters are generated in both base stations. As described above, the new values should be similar to the previous values. In this example, it is assumed that the configuration values are respectively increased by one step. For a network according to the LTE standard, this results in the following values for example: hm=1 dB, ttt=10 ms (the LTE standard requires discrete values).
5. Both base stations apply the new configuration values and check the handover behavior (as in 1). Assumed result:
a. Ping-pong rate: 50%
b. Handover error rate: 10%
6. Now it must be evaluated whether the new configuration achieves better results than the previous configuration. This can be determined e.g. by means of Equation 1.

$$\text{Evaluation} = \frac{1}{10 \cdot \text{Error rate} + \text{ping-pong rate}} \quad (1)$$

This results in: Old configuration: Evaluation: 1/66
New configuration: 1/150
7. The new configuration then achieves an inferior (lower) evaluation result. Because of the high optimization parameter A (which determines the probability that inferior configurations are also accepted) the new configuration is still applied in this example.
8. The optimization parameter A is now reduced (e.g. to 25).
9. Again, new parameters are generated in base stations 10 and 11. E.g. in base station 10: hm=2 dB, ttt=0 ms, in base station 11: hm=2 dB, ttt=20 ms.
10. The optimization process is continued according to the given pattern until values are reached that do no longer exceed acceptable handover error rates and ping-pong rates.
11. When this objective is achieved, the optimization is terminated. It is, however, continually checked whether another optimization is necessary (for example due to changes in the boundary conditions of the network). If this is the case, the process jumps to par. 0, and the optimization is initiated again.

In a further embodiment, it is possible to define different criteria for the termination of the optimization (par. 10 above) and the initiation of the optimization (par. 2 above).

The invention is not limited to the embodiments described herein; reference should be had to the appended claims.

The invention claimed is:
1. A method for optimizing the handover behavior in a mobile radio network, comprising the steps of:
a) determining, during a first period of time, the handover behavior of at least one base station of the mobile radio network, with current configuration values of the handover
parameters of the at least one base station;
b) evaluating a current configuration of the at least one base station based on the determined handover behavior during the first period of time;
c1) in the case that step b) does not indicate a need for optimization: repeating steps a) and b); or c2) in the case that step b) indicates a need for optimization: setting an optimization parameter A to a maximum value Amax;
d) modifying configuration values of at least one handover parameter;
e) determining, during a second period of time, the handover behavior of the least one base station of the mobile radio network, with the modified configuration values of the handover parameters of the at least one base station;

f) evaluating a modified configuration of the at least one base station based on the determined handover behavior during the second period of time;

g) comparing a result of the evaluation of the current configuration of the at least one base station with a result of the evaluation of the modified configuration of the at least one base station;

h1) accepting the modified configuration with a probability depending on a current level of the optimization parameter A if step g) indicates that the modified configuration is worse than a preceding configuration, and continuing with step (i); or h2) accepting the modified configuration and checking whether a check result for the modified configuration fulfills a termination criterion if step g) indicates that the modified configuration is better than the preceding configuration;

i) reducing the optimization parameter A; and j) repeating steps d) to i).

2. The method according to claim 1, wherein errors occurring in steps a) and e) are determined, wherein the errors include at least one of erroneous handovers and unnecessary handovers, and wherein at least one of a handover error rate and a ping-pong rate is determined.

3. The method according to claim 2, wherein the evaluation of respective configurations in steps b) and f) are based on an evaluation function that takes into account the at least one of a handover error rate and a ping-pong rate.

4. The method according to claim 2, wherein step b) further comprises a step of comparing the result of the evaluation of the current configuration with at least one threshold value with respect to necessity of an optimization of the handover behavior.

5. The method according to claim 4, wherein current handover parameters will be maintained and the method is continued with step a) if no optimization of the handover behaviour is necessary.

6. The method according to claim 1, wherein the modification of the configuration values in step d) includes:
(i) selecting a first handover parameter;
(ii) choosing whether the selected parameter should be increased or reduced; and
(iii) accordingly increasing or reducing the parameter value by the smallest possible step.

7. The method according to claim 6, wherein the modification of the configuration values in step d) includes:
(iv) repeating the steps (i) to (iii) for at least one further handover parameter.

8. The method according to claim 4, wherein step h2) includes a step of comparing the result of the evaluation for the modified configuration with at least one threshold value with respect to the termination of the optimization of the handover behavior.

9. The method according to claim 8, wherein, if a termination of the optimization of the handover behaviour is possible, the modified handover parameters are applied and the method is continued with step a), and, if a termination of the optimization of the handover behavior is not yet possible, the modified handover parameters are applied and the method is continued with step i).

10. The method according to claim 9, wherein different threshold values are used for initiation of the optimization and termination of the optimization.

11. The method according to claim 1, wherein configuration values of handover parameters are stored in a superordinate network component.

12. The method according to claim 1, wherein configuration values of handover parameters are stored locally in a respective base station.

13. The method according to claim 1, wherein each base station has a software component, wherein a respective software component performs determination and local storage of the configuration values for handover parameters.

14. The method according to claim 1, wherein the mobile radio network is a GSM, UMTS or LTE mobile radio network or a WiMAX network.

15. The method according to claim 1, wherein hysteresis margin and time to trigger are used as handover parameters.

16. A network component in a mobile radio network for optimizing the handover behavior in a mobile radio network, comprising:

a determination device for determining, during a first period of time, the handover behavior of at least one base station of the mobile radio network, with current configuration values of the handover parameters of the at least one base station;

an evaluation device for evaluating a current configuration of the at least one base station based on the handover behavior determined during the first period of time;

a setting device for setting an optimization parameter to a maximum value;

a modifying device for modifying configuration values of at least one handover parameter;

wherein the determination device is further adapted to determine, during a second period of time, the handover behavior of the least one base station of the mobile radio network: with the modified configuration values of the at least one handover parameter of the at least one base station;

wherein the evaluation device is further adapted to evaluate a modified configuration of the at least one base station based on handover behavior determined during the second period of time; and a comparing device for comparing a result of the evaluation of the current configuration of the at least one base station with a result of the evaluation of the modified configuration of the at least one base station;

wherein the network component is adapted to accept the modified configuration with a probability depending on a current level of the optimization parameter if the modified configuration is worse than the preceding configuration mid to check whether a result of an evaluation result of the modified configuration fulfills a termination criterion if the modified configuration is better than the preceding configuration;

wherein the network component is further adapted to continue optimization with a reduced optimization parameter.

* * * * *